(12) United States Patent
Peccetti

(10) Patent No.: US 10,029,874 B2
(45) Date of Patent: Jul. 24, 2018

(54) MOTORIZATION GROUP OF REELS IN A MACHINE FOR WINDING PLASTIC FILM

(71) Applicant: COLINES S.P.A., Novara (IT)

(72) Inventor: Eraldo Peccetti, Novara (IT)

( * ) Notice: Subject to any disclaimer, the term of this patent is extended or adjusted under 35 U.S.C. 154(b) by 230 days.

(21) Appl. No.: 14/917,640

(22) PCT Filed: Sep. 18, 2014

(86) PCT No.: PCT/EP2014/002524
§ 371 (c)(1),
(2) Date: Mar. 9, 2016

(87) PCT Pub. No.: WO2015/043730
PCT Pub. Date: Apr. 2, 2015

(65) Prior Publication Data
US 2016/0221784 A1    Aug. 4, 2016

(30) Foreign Application Priority Data
Sep. 25, 2013 (IT) .............................. MI2013A1577

(51) Int. Cl.
*B65H 19/22*        (2006.01)
(52) U.S. Cl.
CPC ..... *B65H 19/2223* (2013.01); *B65H 19/2207* (2013.01); *B65H 2403/20* (2013.01)
(58) Field of Classification Search
CPC ........ B65H 18/10; B65H 19/22; B65H 18/26; B65H 19/2215; B65H 19/2223; B65H 19/2207; B65H 2403/20
See application file for complete search history.

(56) References Cited

U.S. PATENT DOCUMENTS

| 4,269,370 | A  |   | 5/1981  | Carter et al. |   |
|---|---|---|---|---|---|
| 4,529,141 | A  | * | 7/1985  | McClenathan | ........ B26D 1/425 242/527.1 |
| 5,054,707 | A  |   | 10/1991 | Olson |   |
| 5,845,867 | A  | * | 12/1998 | Hould | ................ B65H 19/2223 242/527 |
| 7,559,503 | B2 | * | 7/2009  | McNeil | .................. B65H 18/26 242/533.3 |
| 8,201,768 | B2 | * | 6/2012  | Altesellmeier | ........ B65H 18/26 242/533.4 |

FOREIGN PATENT DOCUMENTS

JP      2009120404 A    6/2009
WO    WO2012046151 A1   4/2012

* cited by examiner

*Primary Examiner* — William Arauz Rivera
(74) *Attorney, Agent, or Firm* — Themis Law

(57) ABSTRACT

A motorization group of reels in a machine for winding plastic film onto bobbins, wherein at least two spindles are positioned on a rotating plate around a central shaft constrained to a frame of the machine, a motor being operatively coupled to each of the spindles, in the motorization group each of the motors being constrained to the frame and connected to each of the spindles by a belt transmission which comprises a central deflector unit aligned with a central shaft outside the frame, toothed belts connecting the central deflector unit, on the one hand, to the spindles, and on the other hand, to the motors.

4 Claims, 4 Drawing Sheets

MOTORIZATION GROUP OF REELS IN A MACHINE FOR WINDING PLASTIC FILM

The present invention relates to a motorization group of reels in a machine for winding plastic film onto bobbins.

In the field of machines for winding plastic film onto bobbins, reels provided with spindles are envisaged, which effect the winding of plastic film onto the final desired bobbins.

For this purpose, motors are envisaged, for moving the single spindle of the single reel, capable of operating successfully without any problems in the formation of the bobbins thus obtained.

In these winding machines, the necessity of effecting extremely rapid bobbin-change cycles leads to the need for having equally rapid change sequences. During these sequences, the spindle of the reel, i.e. the bobbin being formed on the same, loses con-tact with the contact cylinder, thus creating so-called "air" winding.

This entails the necessity of having a motorization connected directly to the spindle of the reel in question, by means of a frequency controlled motor. Furthermore, the same configuration of the winding group (of the "revolver" type, typically used specifically due to the necessity of having extremely rapid change sequences) imposes the relative rotation of the reel spindle with respect to a rotation centre outside the same.

This could lead to the necessity of having the motors connected to the single spindles of the single reels, also rotating around said rotation centre.

This kind of embodiment implies the assembly of all the control parts of the above-mentioned motors (frequency variators, control CPUs, remote switches, etc.) on a rotating plate assembled in axis with the rotation centre outside the reels. This arrangement leads to the necessity of using rotating joints (typically of the mercury type) for conveying signals and power supply to these components, and also to the motors themselves.

This configuration, especially in the presence of extremely high velocities, as in this case (up to 800 m/min and over), consequently entails the extremely high risk of having significant and damaging vibrations.

These vibrations are caused by an inevitable unbalancing of the system. A system such as this, in fact, on the one hand has a considerable constant weight represented by the above-mentioned components, inevitably assembled cantilevered with respect to the supporting structure of the machine. On the other hand, the system has a second equally considerable weight but extremely variable during the operational phases, and also unbalanced with respect to the single spindles of the reels, represented by the bobbins being wound.

The general objective of the present invention is to solve the above-mentioned drawbacks of the known art, in an extremely simple, economical and particular functional manner.

A further objective of the present invention is to provide a motorization group of reels in a winding machine of plastic film onto bobbins which does not have heavy cantilevered components which rotate with respect to the frame.

Yet another objective of the present invention is to provide a motorization group of reels in a winding machine of plastic film onto bobbins which eliminates the vibrations specifically due to the varied arrangement of weights in the rotating parts.

In view of the above objectives, according to the present invention, a motorization group of reels in a winding machine of plastic film onto bobbins has been conceived, having the characteristics specified in the enclosed claims.

The structural and functional characteristics of the present invention and its advantages with respect to the known art will appear even more evident from the following description, referring to the enclosed drawings which show an embodiment of a motorization group of reels in a winding machine of plastic film onto bobbins produced according to the invention.

Figure 1:
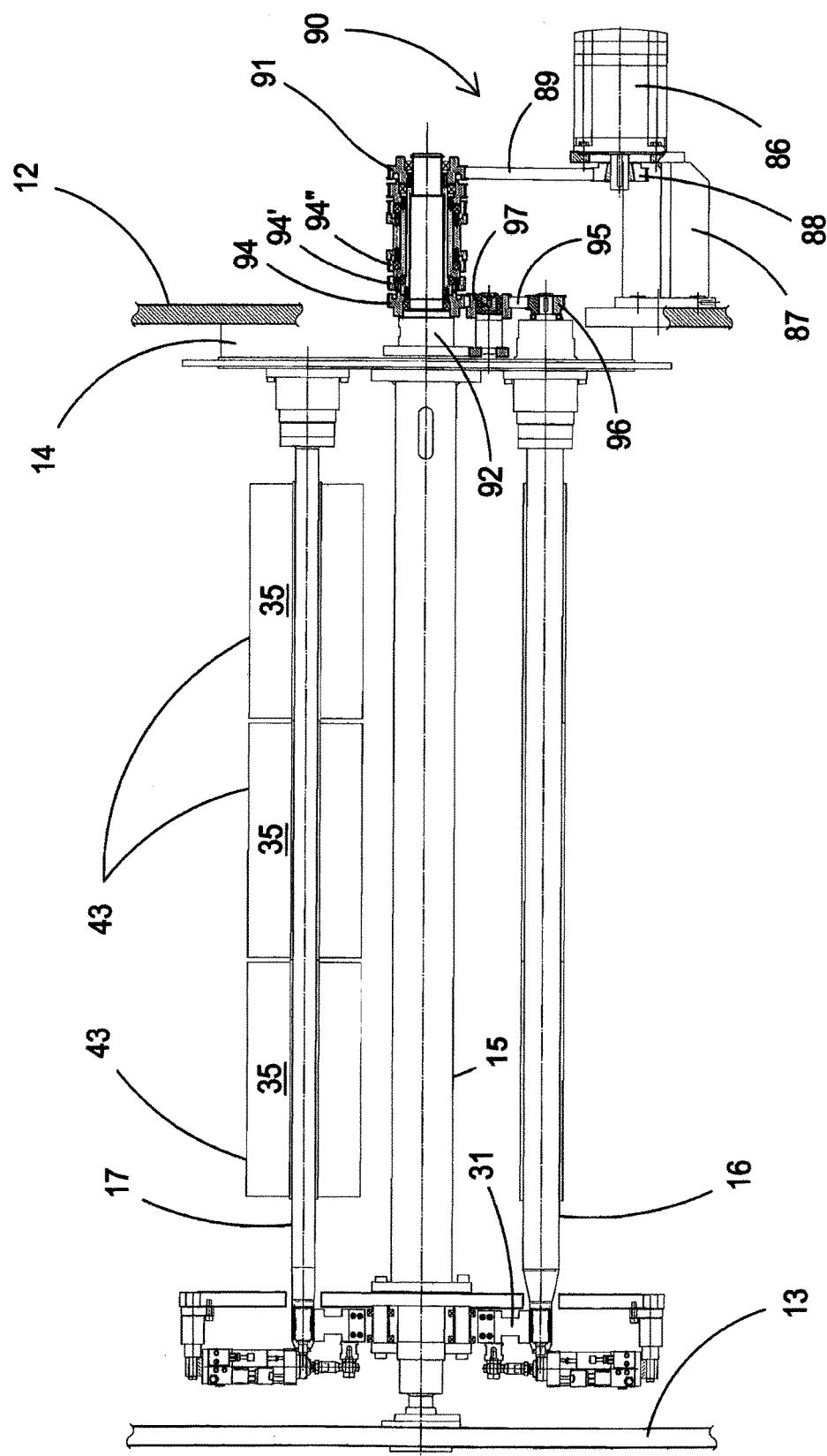
FIG. 1 is a schematic raised side view showing part of a winding machine comprising a motorization group of reels in a winding machine of plastic film onto bobbins produced according to the invention.

With reference first of all to FIG. 1, this illustrates a schematic raised side view showing part of a winding machine of plastic film onto bobbins, mainly in the area comprising a motorization group of reels 90 produced according to the invention.

The motorization group of reels 90 is arranged outside the structure consisting of two vertical uprights 12, 13 which form the shoulders of a frame of the winding machine.

The first upright 12 carries cantilevered on a rotating supporting plate 14, a central shaft 15, supported, at the other end, by the second upright 13.

The plate 14, rotating around the central shaft 15, also carries three spindles 16, 17 and 18, arranged at 120° with respect to each other, which complete the winding reel.

This system is repeated for as many times as the total number of reels (3 in the example, but which can generally vary from 2 to 4).

The figures show how, in the example illustrated of three reels 16, 17 and 18, there are three motors 86, 86' and 86" for the independent rotational movement of the spindles 16, 17 and 18. The three motors 86; 86' and 86" are fixed to the frame of the machine, in the example on brackets 87 of the first upright 12.

The present invention, in fact, proposes a "static" solution specifically for preventing the vibrations and drawbacks mentioned above, i.e. with the assembly of the motors of the reels and relative command and control components in a fixed position, firmly anchored to the supporting structure of the machine.

This can be effected thanks to the new and original solution which envisages a central deflector unit 83, aligned with the central shaft 15, for transmitting the motion coming from the various motors 86, 86' and 86", through belts to all of the spindles 16, 17 and 18 of the reels present.

Figure 2:
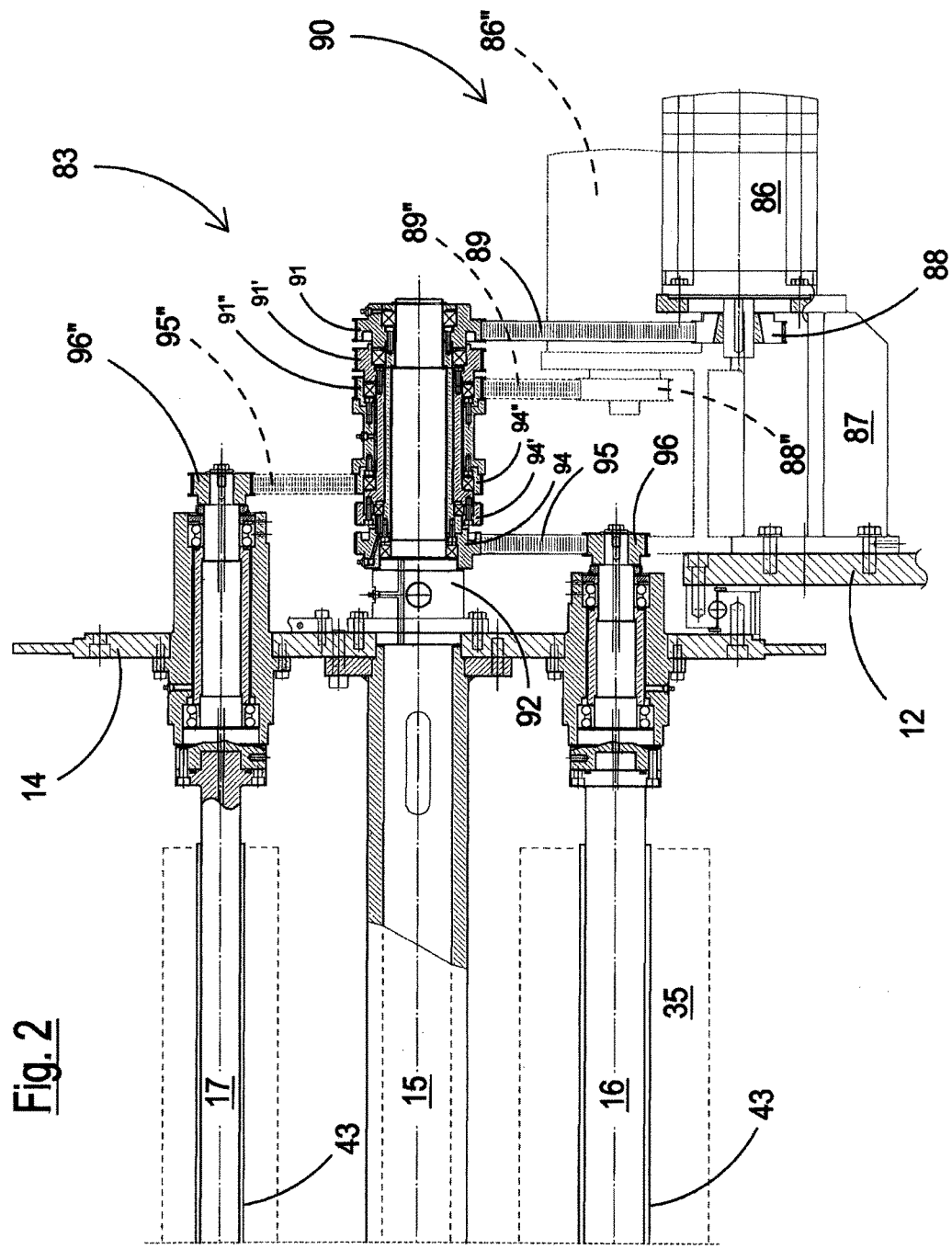
FIG. 2 is an enlarged view of some parts of FIG. 1, partially sectioned for a better understanding, which shows the connection of a single motor to the respective reel and spindle.

FIG. 2 very clearly illustrates a single reel with its spindle 16 and its functioning principle with a part of the arrangement of the motorization group of the reels 90 produced according to the invention, and the central deflector unit 83 mentioned above.

In the example, the motor 86 effects the rotation movement of the spindle 16 of this reel. A pulley 88 is in fact inserted onto a shaft of the motor 86 and controls a toothed belt 89.

This pulley 88 inserted onto the shaft of the motor 86, is, in turn, connected by means of the toothed belt 89 to a pulley 91 assembled in axis on an extension 92 of the shaft 15. More specifically, there is presence of the central deflector unit 83 aligned with the central shaft 15 which, as already mentioned, forms the rotation centre of the rotating plate 14 carrying the spindles of the reels, outside the structure of the machine, or the first upright 12.

In particular, the pulley 91 is inserted integrally onto a shaft 93 of the central deflector unit 83. A further pulley 94 is also inserted onto said shaft 93 of the central deflector unit 83 and, in turn, controls an end of a toothed belt 95 which is wound, at the other end, onto a pulley 96 inserted in an extension of the spindle 16 of the above-mentioned reel.

This part of the arrangement of the motorization group of reels 90 and the deflector unit mentioned above according to the invention, is repeated for as many times as the total number of reels (typically three, as illustrated, but generally varying from 2 to 4) to form the complete motorization group of reels.

Figure 4:
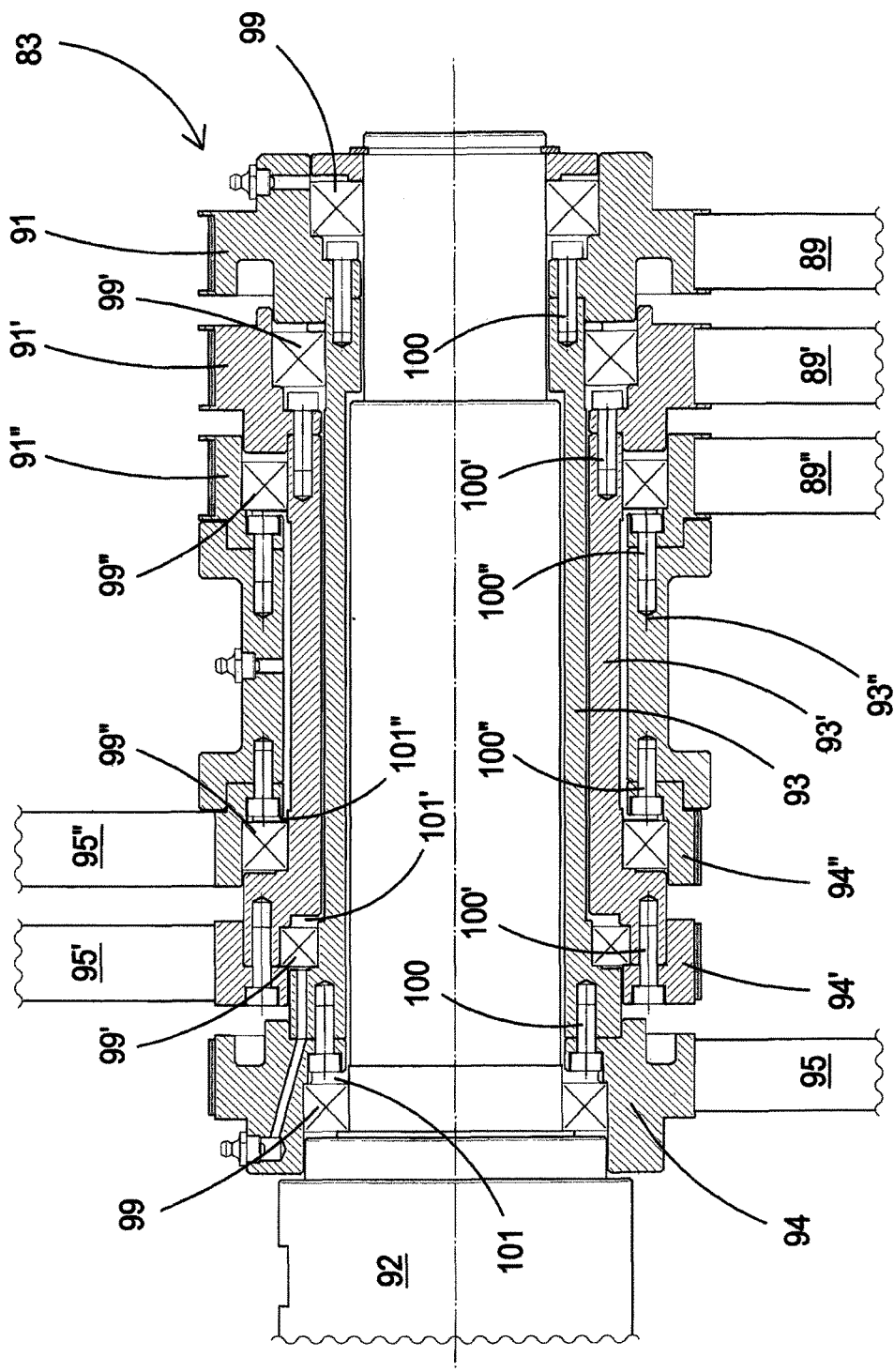
FIG. 4 is an enlarged sectioned detail of the central deflector unit with three coaxial shafts, forming part of the motorization group of the present invention.

In the embodiment shown, the central deflector unit 83 has three coaxial shafts as is clearly evident in FIG. 4, which is an enlarged sectioned detail.

In the figures, reference numbers have been used, without an index or with an index ', or two ", etc. for the various spindles 16, 17 and 18 described and illustrated.

Said central deflector unit 83, with three coaxial shafts, allows an easy rotation of the rotating plate 14 carrying the spindles 16, 17 and 18 without any problem for the various connecting belts 89, 89', 89" and 95, 95', 95" between the motors 86, 86', 86", fixed to the shoulder 12 of the frame, and the reels 16, 17 and 18 which, on the contrary, are present on the rotating plate 14.

The coaxial shafts 93, 93' and 93" are hollow and are positioned on the extension 92 of the central shaft 15 with the interpositioning of end bearings 99, 99' and 99", so as to allow a reciprocal independent rotation with respect to the extension 92.

FIG. 4 shows how this central deflector unit 83 is produced, by arranging the two toothed end pulleys 91 and 94 which cooperate with the transmission of the motion coming from the first motor 86, fixed by means of bolts 100, coaxially directed, at the opposite ends of the first shaft 93. The first shaft 93 has a smaller external diameter than the other shafts and an internal diameter slightly larger than the external diameter of the extension 92. End bearings 99 allow an easy rotation of the pulleys 91 and 94 and hollow shaft 93 during the rotation of the motor 86. The second shaft 93', also hollow, supported by end bearings 99' which allow it to rotate, is positioned above an intermediate area of the first shaft 93. This second hollow shaft 93' carries, at opposite ends, fixed by means of bolts 100', pulleys 91' and 94' which transmit the rotation imparted by the second motor 86'.

Finally, the third shaft 93" is hollow and has a larger internal diameter, which is such as to be able to rotate on the outer surface of the second shaft 93'. This third shaft 93" also carries, fixed to opposite ends by bolts 100", pulleys 91" and 94" which allow the rotation imparted by the third motor 86" to be transmitted.

This arrangement with three coaxial shafts, forming part of the motorization group of the present invention, is cantilevered towards the outside of the upright 12 of the frame, and allows an easy transmission of the motion.

As illustrated, the bearings 99, 99', and 99" are housed in shaped cavities 101, situated in the body of the various pulleys 91 and 94, 91' and 94', and 91" and 94" positioned consecutively on the hollow shafts 93, 93' and 93".

Figure 3:
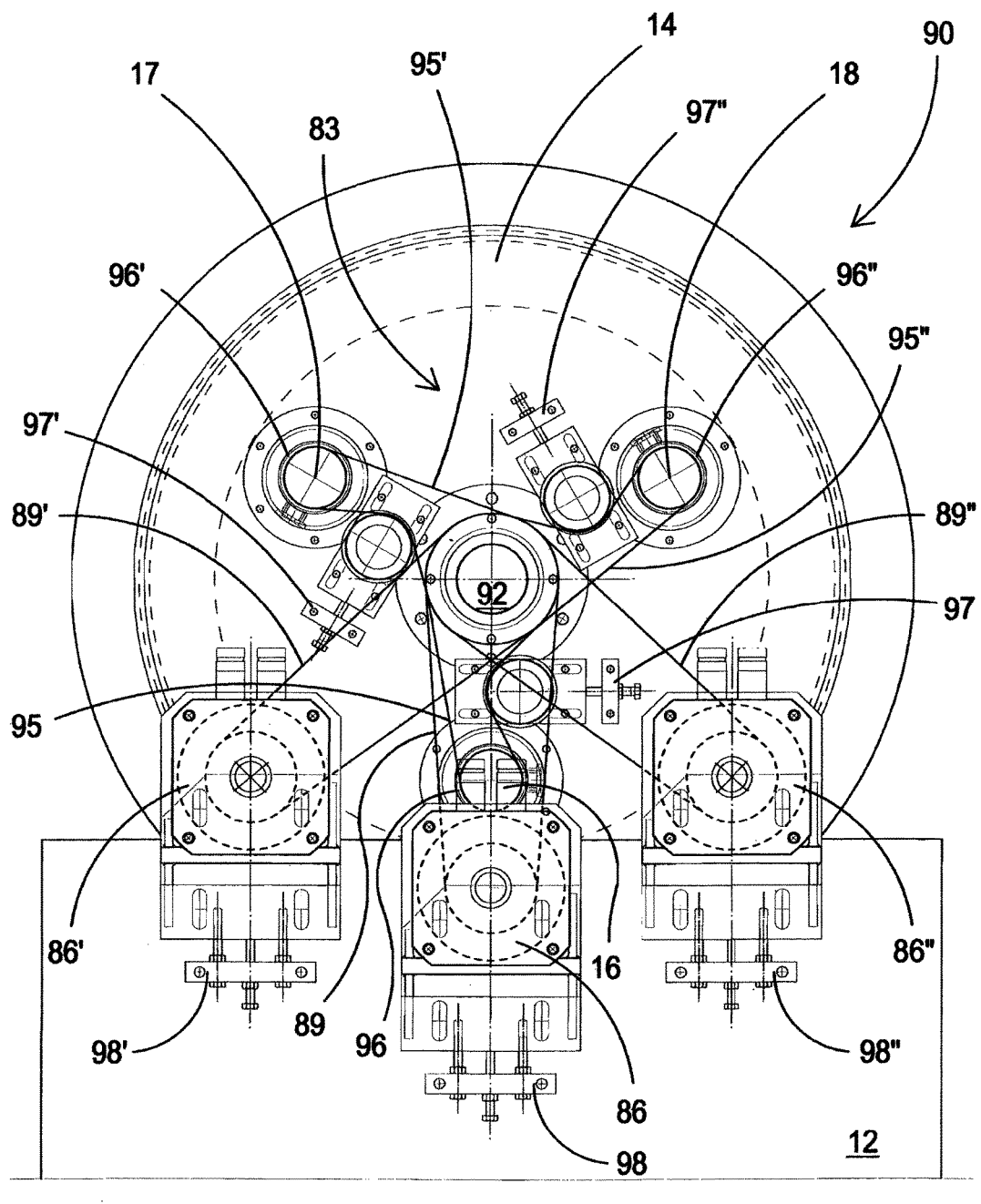
FIG. 3 is a side view of the motorization group of reels in a winding machine of plastic film onto bobbins produced according to the invention.

FIG. 3 clearly shows the example relating to an embodiment with three reels and relative independent spindles (also mentioned above), each equipped with and characterized by the elements previously described and listed.

In particular, belt-tensioning devices 97 (or "guide pulleys") are represented in this FIG. 3, suitable for guaranteeing the correct tensioning of the toothed transmission belt between the pulleys of the central deflector unit 83 with coaxial shafts and the pulleys inserted onto the spindles 16, 17 and 18. These belt-tensioning devices also serve to recover the clearances which are inevitably formed when elements are assembled, due to normal construction tolerances or which can be generated by the consumption of the transmission components involved in the system described.

Analogously, for the toothed transmission belts positioned between the pulleys of the central deflector unit 83 with coaxial shafts and the pulleys inserted on the motors 86, 86', 86", registration devices 98 can be envisaged, for example screws, also shown in FIG. 3.

In this way, for example, the central deflector unit 83 with coaxial shafts, also envisages, in addition to the shaft 93 with a larger diameter, further shafts 93' and 93", coaxial to the same and having a smaller diameter, in axis on the extension 92 of the shaft 15.

In this way, the shaft 93' also carries two pulleys 91' and 94' inserted for the transmission of the motion by means of belts 89' and 95', for example to the spindle 17 driven by the motor 86'.

This arrangement is also repeated for the spindle 18 on which a pulley 96" is inserted, which receives the motion from the belt 95", in turn driven by the pulley 94" positioned on the shaft 93". This shaft 93" carries another inserted pulley 91", driven in rotation by a toothed belt 89' controlled by a pulley 88', directly inserted on a shaft of the motor 86".

According to the present invention, therefore, the driving motors of the spindles of the reels are fixed to the frame and this arrangement prevents the creation of any vibration. No relevant rotating masses are in fact present with a variation in the position of the spindles of the reels.

The winding machine is consequently well balanced and functional also with a variation in the rotating weights formed by the variable size of the bobbins of film being wound.

The objective mentioned at the preamble of the description has therefore been achieved.

The forms of the structure for producing a group of the invention, as also the materials and assembly modes, can obviously differ from those shown for purely illustrative and non-limiting purposes, in the drawings.

The protection scope of the invention is therefore delimited by the enclosed claims.

The invention claimed is:

1. A motorization group of reels in a machine for winding plastic film onto bobbins, comprising:
    a plurality of spindles (16,17,18) positioned on a rotating plate (14) around a central shaft (15) constrained to a frame (12) of the machine, and
    a plurality of motors (86, 86', 86") operatively coupled to said spindles (16,17,18),
    wherein each motor (86, 86', 86") is constrained to said frame (12) and connected to one of said spindles (16,17,18) by a belt transmission, which comprises a central deflector unit (83) aligned with said central shaft (15) outside of said frame (12), wherein toothed belts (89, 89', 89"; 95, 95', 95") connect said central deflector unit (83), on one side, to said spindles (16,17,18) and on another side, to said motors (86, 86', 86"), wherein said central deflector unit (83) comprises hollow shafts (93, 93', 93") positioned on bearings (99, 99', 99") coupled to an extension (92) of said central shaft (15), wherein said hollow shafts have varying lengths and are coaxially overlapping and independently rotatable, and wherein each of said hollow shafts comprises a first toothed pulley that receives a first one of said toothed belts operatively coupled to one of said motors, and a second toothed pulley that receives a second one of said toothed belts that is operatively coupled to one of said spindles.

2. The motorization group according to claim 1, wherein said rotating plate carries three spindles (16,17,18) positioned at 120° with respect to each other, said central deflector unit (83) comprising three hollow coaxial shafts (93, 93', 93").

3. The motorization group according to claim 2, wherein said toothed pulleys (91, 94; 91', 94'; 91", 94") are constrained to ends of said hollow coaxial shafts (93, 93', 93") by bolts (100, 100', 100") which are axially directed.

4. The motorization group according to claim 1, wherein said bearings (99, 99', 99") are housed in shaped cavities (101) situated in a body of the toothed pulleys (91 and 94, 91' and 94', 91" and 94") connected at opposite ends of the hollow shafts (93, 93' and 93").

* * * * *